(12) United States Patent
Suzuki

(10) Patent No.: US 8,429,259 B2
(45) Date of Patent: Apr. 23, 2013

(54) NETWORK MANAGEMENT SYSTEM

(75) Inventor: Satoshi Suzuki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1326 days.

(21) Appl. No.: 11/512,261

(22) Filed: Aug. 30, 2006

(65) Prior Publication Data

US 2007/0047567 A1    Mar. 1, 2007

(30) Foreign Application Priority Data

Aug. 30, 2005  (JP) ................................. 2005-249035

(51) Int. Cl.
*G06F 15/173* (2006.01)
*G06F 3/00* (2006.01)

(52) U.S. Cl.
USPC .................................. 709/223; 710/8; 710/15

(58) Field of Classification Search .................... 709/223
See application file for complete search history.

(56) References Cited

U.S. PATENT DOCUMENTS

| | | | | |
|---|---|---|---|---|
| 5,613,160 | A * | 3/1997 | Kraslavsky et al. | 710/16 |
| 5,784,622 | A * | 7/1998 | Kalwitz et al. | 710/200 |
| 6,516,347 | B1 | 2/2003 | Nakamura | |
| 6,654,798 | B1 * | 11/2003 | Skibinski et al. | 709/220 |
| 6,926,199 | B2 * | 8/2005 | Jay et al. | 235/375 |
| 6,967,728 | B1 * | 11/2005 | Vidyanand | 358/1.12 |
| 7,284,061 | B2 * | 10/2007 | Matsubayashi et al. | 709/229 |
| 7,646,297 | B2 * | 1/2010 | Aaron | 340/539.26 |
| 2002/0095499 | A1 * | 7/2002 | Barnett et al. | 709/226 |
| 2002/0161740 | A1 * | 10/2002 | Nakamura et al. | 707/1 |
| 2003/0126298 | A1 * | 7/2003 | Redford et al. | 709/250 |
| 2004/0034623 | A1 * | 2/2004 | Salmen | 707/2 |
| 2004/0039811 | A1 * | 2/2004 | Nakamura et al. | 709/223 |
| 2004/0203358 | A1 * | 10/2004 | Anderson et al. | 455/41.1 |
| 2005/0109828 | A1 * | 5/2005 | Jay et al. | 235/375 |
| 2006/0067295 | A1 * | 3/2006 | Lehotsky et al. | 370/351 |
| 2006/0072551 | A1 * | 4/2006 | Aoyama et al. | 370/352 |
| 2006/0259317 | A1 * | 11/2006 | Nakazawa | 705/1 |
| 2007/0043805 | A1 * | 2/2007 | Izaki et al. | 709/201 |

FOREIGN PATENT DOCUMENTS

| | | |
|---|---|---|
| EP | 1 075 114 A2 | 2/2001 |
| EP | 1075114 A2 * | 2/2001 |
| JP | 63263512 A * | 10/1988 |
| JP | 2-012334 | 1/1990 |

(Continued)

OTHER PUBLICATIONS

Japanese Office Action, with English Translation, issued in Japanese Patent Application No. 2005-249035, dated May 23, 2008.

*Primary Examiner* — Joseph Avellino
*Assistant Examiner* — James Baron
(74) *Attorney, Agent, or Firm* — McDermott Will & Emery LLP

(57) ABSTRACT

A network management system includes a plurality of terminal devices, and a network to which the plurality of terminal devices are connected. At least one of the plurality of terminal devices includes a management setting information changing system configured to change management setting information for managing network use by the plurality of terminal devices, and a management setting information restoring system configured to perform a restoring operation for restoring the management setting information changed by the management setting information changing system, in response to a predetermined restoring condition being satisfied. The present arrangement enables use of at least one peripheral device by the plurality of terminal devices according to different management settings.

20 Claims, 15 Drawing Sheets

FOREIGN PATENT DOCUMENTS

| | | |
|---|---|---|
| JP | 2-12334 | 1/1990 |
| JP | 8-305519 | 11/1996 |
| JP | 2000-209239 | 7/2000 |
| JP | 2001-043070 | 2/2001 |
| JP | 2005-190418 | 7/2005 |

\* cited by examiner

| USER NAME | PASSWORD | ACCESS LEVEL | CHANGE AUTHORITY |
|---|---|---|---|
| YUTA KOUNO | AQ&TP2 | 1 | A |
| RYOUHEI OTOYAMA | UT#Q28 | 2 | B |
| MATSUO UEDA | 54KPAAZ | 2 | B |
| TAKENORI NAKAGAWA | 24&MZQ | 2 | B |
| HANNSUKE HEIDA | J4K31U | 3 | C |
| UMEYOSHI SHIMOOKA | DZQ43# | 3 | B |
| AKIO UENO | CJP41DY | 3 | C |
| FUITA KAZEGA | MNX234J | 3 | C |

104f

| ACCESS LEVEL | CHANGEABLE SETTING DATA IN DEFINITE MODE |
|---|---|
| 1 | SETTING DATA 1+SETTING DATA 2 |
| 2 | SETTING DATA 2 |

Configure POP 3/SMTP — 211

| | Current Status | Set Value |
|---|---|---|
| SMTP Server Address | 0.0.0.0 | |
| POP3 Server Address | 0.0.0.0 | |
| Printer E-mail Address | testmail@printer.com | |

[Apply] [Temporal Apply] [Property] [Cancel]

FIG. 7

Configure Notification — 212

| | Current Status | Set Value |
|---|---|---|
| SMTP Server Address | 0.0.0.0 | |
| Administrator E-mail Address | testest@mail.com | |
| Printer E-mail Address | testmail@printer.com | |

[Apply] [Temporal Apply] [Property] [Cancel]

FIG. 8

NETWORK MANAGEMENT SYSTEM

CROSS-REFERENCE TO RELATED APPLICATION

This application claims priority under 35 U.S.C. §119 from Japanese Patent Application No. 2005-249035, filed on Aug. 30, 2005. The entire subject matter of the application is incorporated herein by reference.

BACKGROUND

1. Technical Field

The following description relates to a network management system.

2. Related Art

It is necessary for two or more terminal devices being interconnected via a network, or sharing a peripheral electronics device such as a printing device (printer) to configure management settings such as network protocol settings (e.g., IP address settings for mutual identification on the network), user registration settings, and access condition settings for each of the terminal devices and peripheral electronics device. For example, such a management setting process is performed using dedicated management software (a management tool) different from application software applied for using functions of the peripheral electronics device, when the peripheral electronics device is connected to the network.

The management setting process is generally performed in a terminal device dedicated for an administrator (so-called management server). However, the management setting process can be executed even in another terminal device, when the management tool is installed therein. In general, a user registered as a network administrator is given an authority to execute the management setting process, and is allowed to access the network and perform the management setting process in a unified manner by inputting an administrator ID and/or a password.

However, when the number of the terminal devices or the peripheral electronics devices increases and the settings to be managed are thereby more complicated, two or more administrators may be registered, and each of them may be given the authority to execute the management setting process. In such a case, when the different administrators separately change the management settings, significant changes of the management settings configured earlier might be updated with setting changes configured later, or might be deleted. There is disclosed as a technology to solve this problem in Japanese Patent Provisional Publication No. HE12-12334 an access control method in which an access level is set for each of the two or more administrators, and a setting change request for changing the management settings configured by another administrator of a higher access level, issued from an administrator of a lower access level, is rejected.

SUMMARY

Aspects of the present invention are advantageous in that there can be provided an improved network management system configured to efficiently prevent a trouble that might be caused for such a reason that a precedent user of a network forgets to restore management settings for the network that have temporarily been changed, when a next user utilizes the network.

BRIEF DESCRIPTION OF THE ACCOMPANYING DRAWINGS

FIG. 5 schematically shows an example of access level setting data in accordance with one or more aspects of the present invention.

FIG. 6 is a first example of a management setting window in accordance with one or more aspects of the present invention.

FIG. 7 is a second example of the management setting window in accordance with one or more aspects of the present invention.

FIG. 8 is a third example of the management setting window in accordance with one or more aspects of the present invention.

Figure 9:
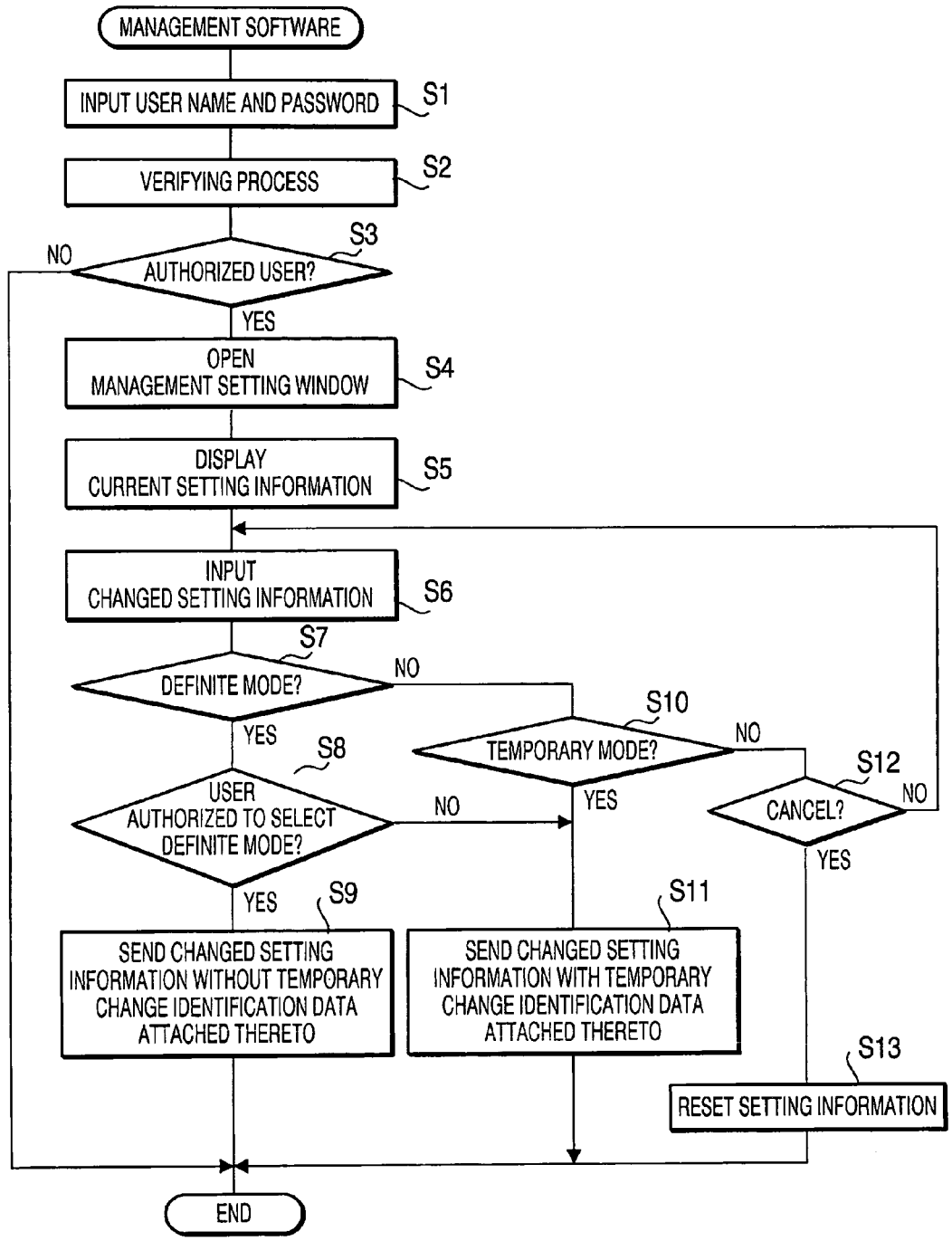

FIG. 9 is a flowchart showing an example of a procedure of management software at a terminal device side in accordance with a first aspect of the present invention.

Figure 10:
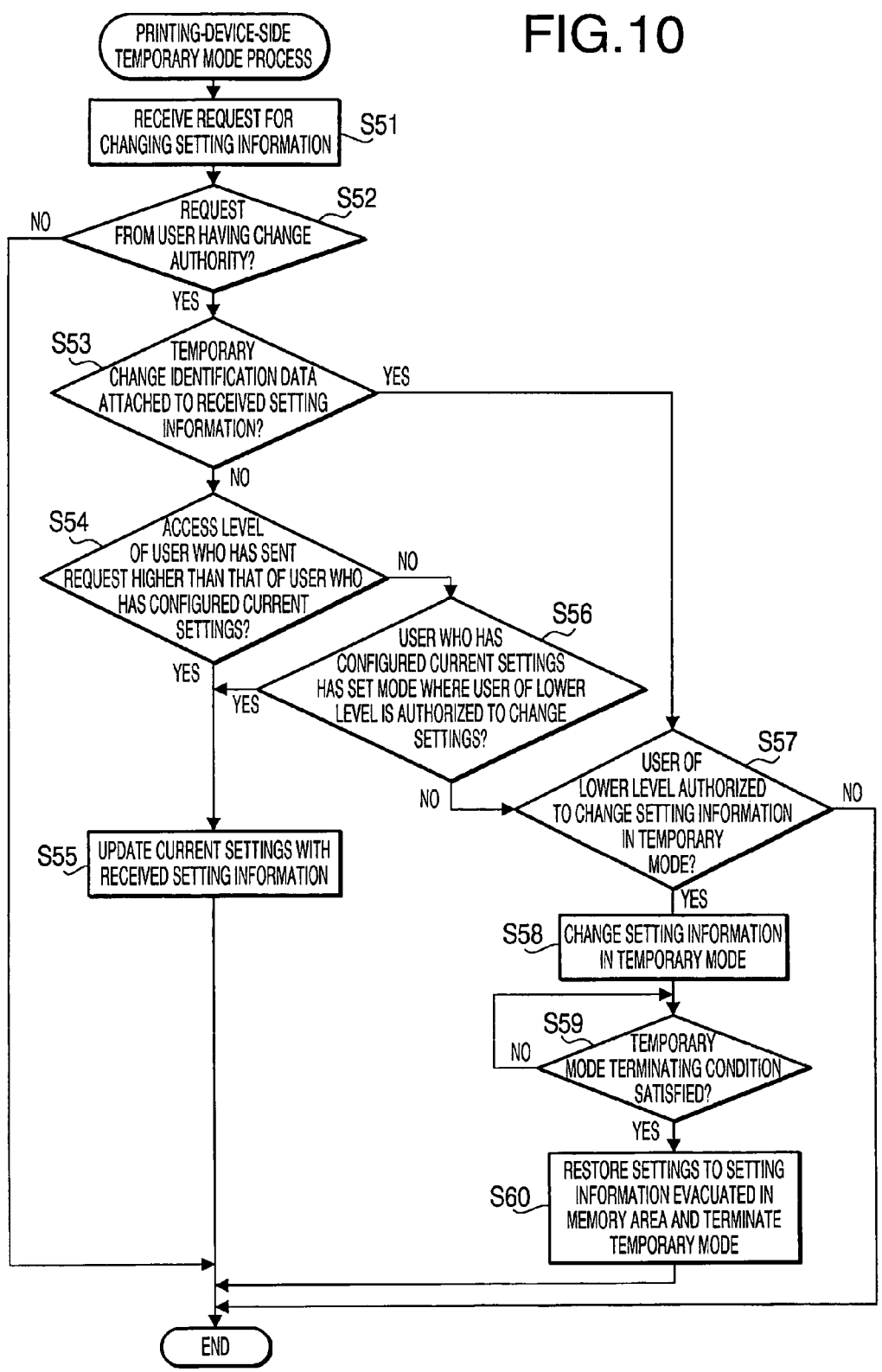

FIG. 10 is a flowchart showing an example of a procedure of a temporary mode processing program executed by the printing device in accordance with one or more aspects of the present invention.

Figure 11:
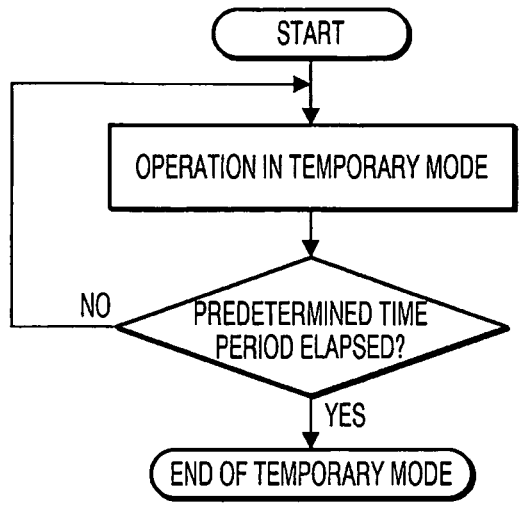

FIG. 11 is a flowchart showing a first example of a procedure of a satisfaction judging routine in accordance with one or more aspects of the present invention.

Figure 12:
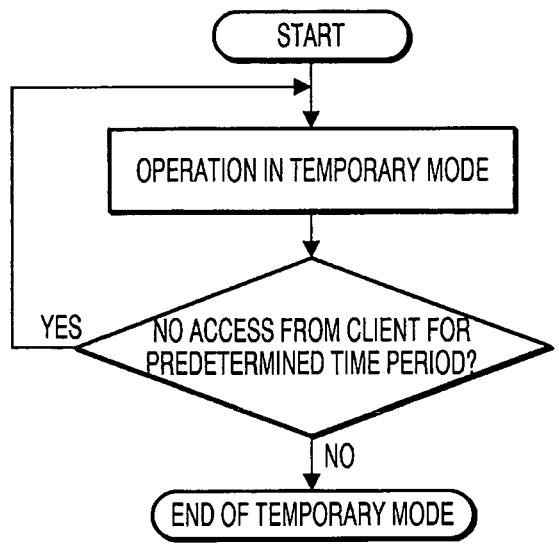

FIG. 12 is a flowchart showing a second example of the procedure of the satisfaction judging routine in accordance with one or more aspects of the present invention.

Figure 13:
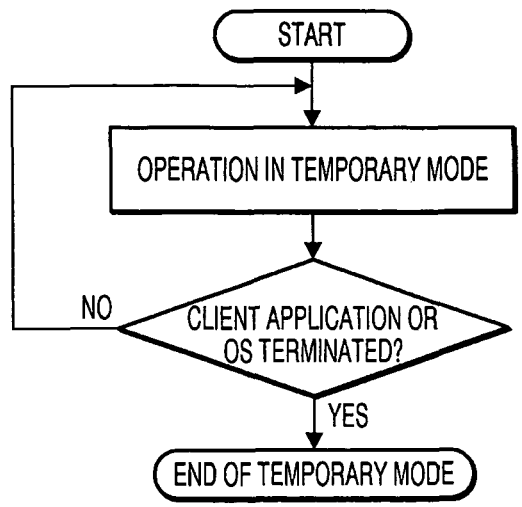

FIG. 13 is a flowchart showing a third example of the procedure of the satisfaction judging routine in accordance with one or more aspects of the present invention.

Figure 14:
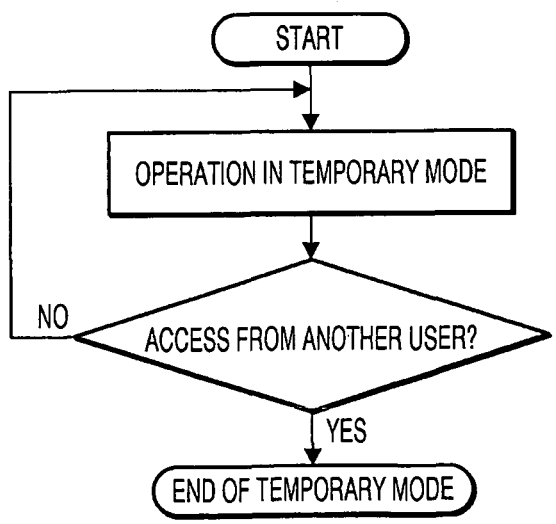

FIG. 14 is a flowchart showing a fourth example of the procedure of the satisfaction judging routine in accordance with one or more aspects of the present invention.

Figure 15:
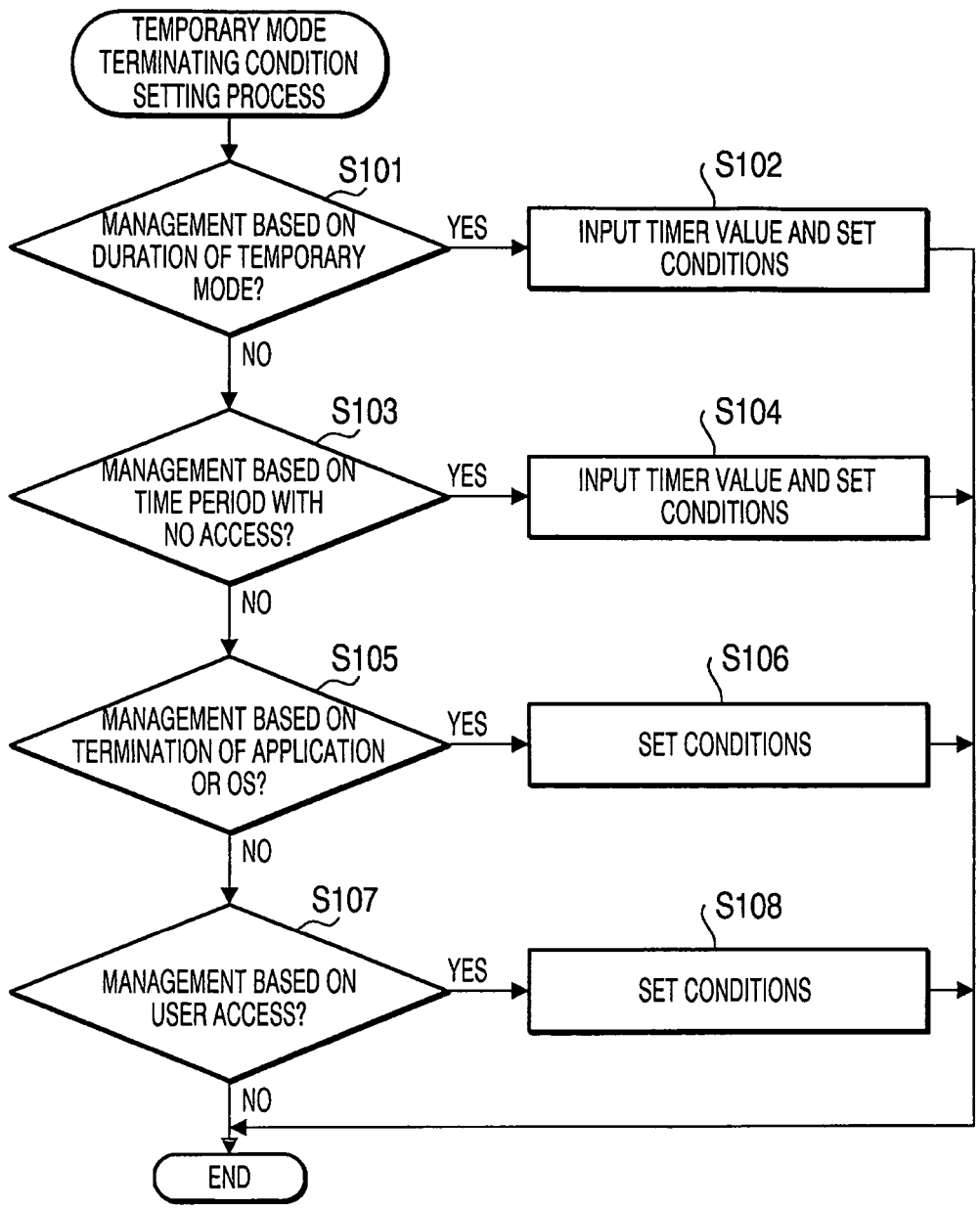

FIG. 15 is a flowchart showing an example of a procedure of a setting process for setting an automatically restoring condition in accordance with one or more aspects of the present invention.

Figure 16:
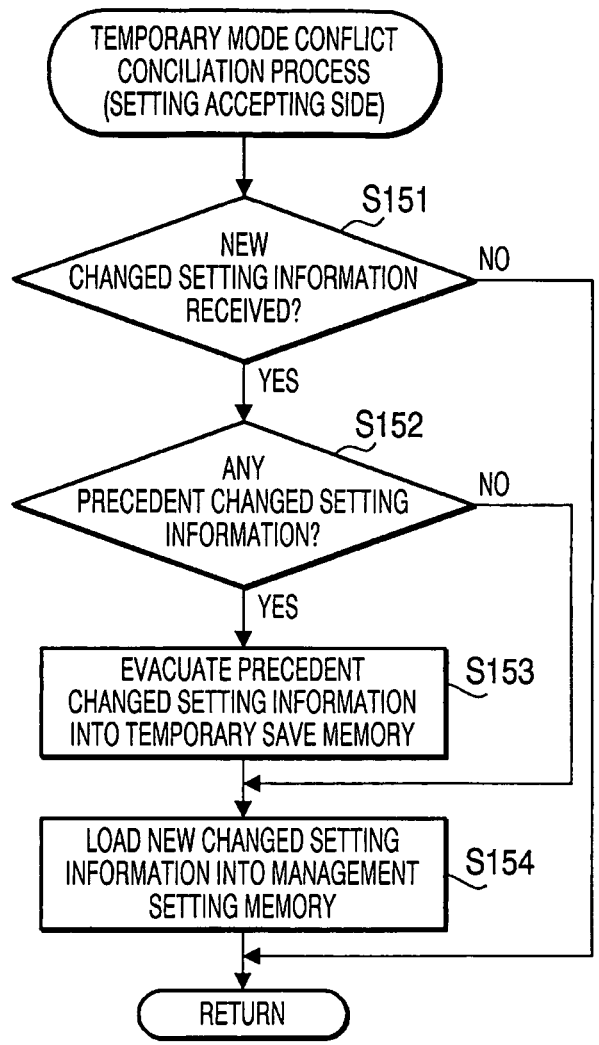

FIG. 16 is a first flowchart showing an example of a procedure of a temporary mode conflict conciliation process in accordance with one or more aspects of the present invention.

Figure 17:
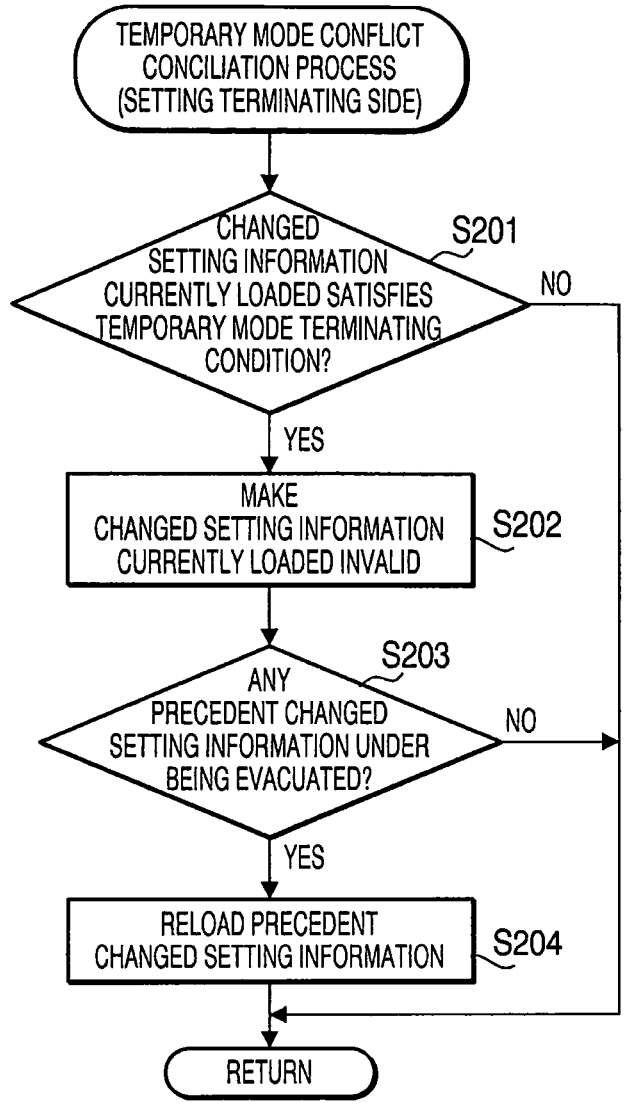

FIG. 17 is a second flowchart showing another example of the procedure of the temporary mode conflict conciliation process in accordance with one or more aspects of the present invention.

Figure 18:
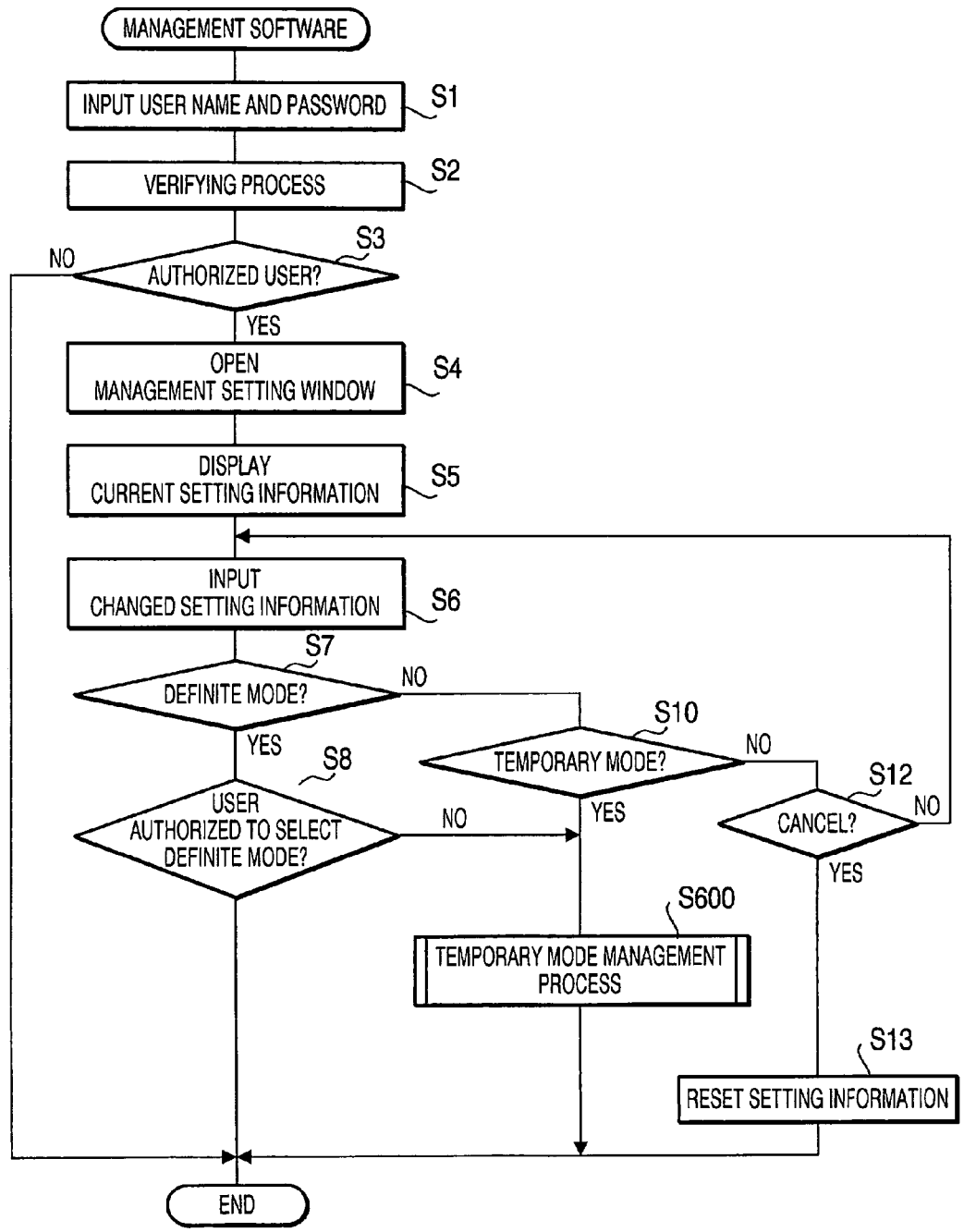

FIG. 18 is a flowchart showing an example of a procedure of management software at a terminal device side in accordance with a second aspect of the present invention.

Figure 19:
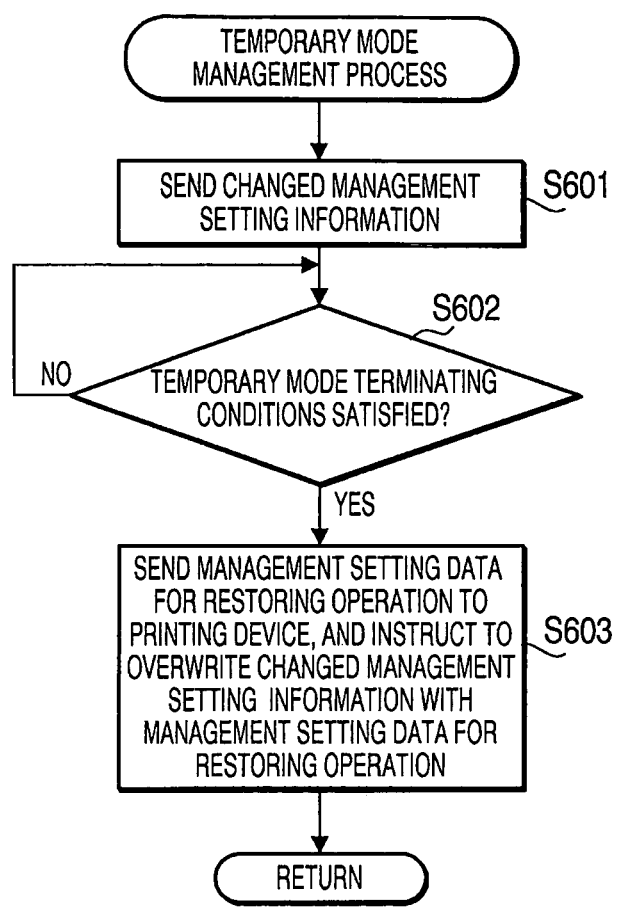

FIG. 19 is a flowchart showing an example of a detailed procedure of a temporary mode management process shown in FIG. 18 in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a network management system, which comprises: a plurality of terminal devices; and a network to which the plurality terminal devices are connected. At least one of the plurality of terminal devices comprises a management setting information changing system configured to change management setting information for managing usage of the network by the plurality of terminal devices, and a management setting information restoring system is configured to perform a restoring operation for restoring the management setting information changed by the management setting information changing system, in response to a predetermined restoring condition being satisfied.

It is noted that the above term "usage of the network" represents to access, from a terminal device connected to the network, another terminal device or a peripheral device connected to the network via the network, and to use the aforementioned another terminal device or the peripheral device based on the access. In addition, the above term "management setting information for managing usage of the network" represents management setting information for a terminal device as a subject in the usage of the network, or for the other terminal devices or the peripheral devices as destinations to be accessed thereby.

The management setting information that has been changed once based on the input operation through the input interface of the terminal device can be restored to the management setting information before being changed by performing an input operation through the input interface again. However, such operations are troublesome. Further, when a user forgets the input operation for the restoring operation, the changed management setting information is held as it is until another user performs an input operation for changing the management setting information. According to some aspects of the present invention, even though the user forgets the input operation for the restoring operation, the changed management setting information can automatically be restored when a predetermined restoring condition is satisfied. Consequently, such a trouble that a next user cannot normally connect the terminal device to the network, or that the peripheral device becomes unavailable or does not operate in a desired manner can efficiently be prevented.

Optionally, the network management system may include at least one peripheral device connected to the network. In this case, the at least one peripheral device may be used in common by the plurality of terminal devices via the network based on the management setting information. Even though the management setting information for the peripheral device is temporarily changed when using the peripheral device, the changed management setting information can automatically be restored to the management setting information before being changed in response to the restoring condition being satisfied. Therefore, even when the user forgets an operation of restoring the information, use of the peripheral device thereafter can efficiently be prevented from being affected.

Further, when the user wishes to temporarily change the management setting information for some operations, the changed management setting information, which is unnecessary after completing the aforementioned operations, is desired to be immediately restored to the previous condition. In this case, a predetermined time period may be set such that the management setting information changed by the input operation to perform the aforementioned operations can be maintained for the predetermined time period, and thereafter, the changed information is automatically restored to predetermined management setting information before being changed. Optionally, the management setting information restoring system may be configured to judge that the predetermined restoring condition is satisfied in response to the predetermined time period elapsing after the management setting information has been changed by the management setting information changing system.

Specifically, a timer, configured to set the predetermined time period of waiting for changed management setting information to be automatically restored and to measure elapsed time until the set predetermined time period has elapsed, can be provided. The management setting information restoring system can be configured to perform the restoring operation after the measurement of the set predetermined time period by the timer has been completed. Namely, the aforementioned restoring operation can certainly be performed with the measurement of the set predetermined time period by the timer being completed.

For example, when any user access has not unnaturally been provided to an input portion of the terminal device for a long time after the management setting information had been changed, the user is likely to forget to restore the management setting information that the user has temporarily changed with intent to restore it later. In order to prevent such a mistake, optionally, the management setting information restoring system may be configured to judge that the predetermined restoring condition is satisfied in response to a predetermined time period elapsing after an input operation for changing the management setting information has been performed for a terminal device, without another input operation being performed for the terminal device. Thereby, there can efficiently be prevented such a trouble that the changed management setting information is forcibly restored to previous information by the timer or the like despite the changed management setting information being still necessary (e.g., a certain operation being in execution).

In the meantime, optionally, the management setting information changing system and management setting information restoring system may be configured to function with management software being run in the at least one of the plurality of terminal devices. Still optionally, the management setting information restoring system may be configured to judge that the predetermined restoring condition is satisfied in response to one of the management software and infrastructure software of a lower layer (i.e., a closer layer to computer hardware) than the layer of the management software being terminated. According to some aspects of the invention, after some operations on the network has been completed accompanied by the management setting information being changed, it is judged that the restoring condition is satisfied at a timing when the management software or the infrastructure software thereof (platform or operating system) is terminated. Thereby, there can efficiently be prevented such a trouble that the changed management setting information is forcibly restored to previous information by the timer or the like despite the changed management setting information being still necessary (e.g., a certain operation being in execution).

Optionally, the management setting information restoring system may be configured to judge that the predetermined restoring condition is satisfied in response to the peripheral device being accessed, after the input operation for changing the management setting information for a terminal device has been performed from another terminal device. Namely, when a first user (administrator) has changed the management setting information from a specified terminal device, and a second user who does not wish for the management setting information being changed has accessed the aforementioned peripheral device from another terminal device, the aforementioned restoring operation is immediately performed. Therefore, the changed management setting information does not affect the usage of the peripheral device by the second user.

Optionally, the peripheral device may be a printing device. In this case, the management software may be installed in the at least one of the plurality of terminal devices as different software from application software for generating a printing job for the printing device. Further optionally, the management setting information may be stored in a management setting information storing portion configured such that information stored therein can be rewritten not with the application software, but with the management software. Thereby, for example, there can efficiently be prevented such a trouble that a general user who is not authorized as an administrator wrongly (or purposely) rewrite the management setting information from a side of application software using the printing device.

Optionally, the peripheral device may comprise a mail sending and receiving function for sending and receiving an e-mail transmitted through an external communication network connected the network. In this case, the management setting information may include information about the mail sending and receiving function. By the mail sending and receiving function being incorporated in the peripheral device, a utility value of the printing device used via the communication is enhanced. In this case, since settings on the usage of e-mail are included in the management settings for the printing device, a coverage to which the invention can be applied is widened. Specifically, the aforementioned peripheral device can be configured as a printing device, and the printing device can be configured with a mail receiving source device function for receiving an e-mail in which printing image data sent via an external communication network connected with the network are incorporated and a mail sending source device function for incorporating printing image data received from the terminal device via the network into an e-mail to send the e-mail to the external communication network. With the function of sending and receiving the e-mail incorporating the printing image data being provided in the printing device, the utility value of the printing device used via the communication can be enhanced.

Optionally, the management setting information (to be changed) may include information about settings for a network protocol of the peripheral device. Changes of the network protocol setting information for the peripheral device directly affect an access to the peripheral device from the terminal device connected to the network. Accordingly, when the user forgets to restore the changed management setting information, an inaccessible terminal device and/or an inaccessible peripheral device might appear. The present invention can prevent such a trouble.

Optionally, the network management system may further comprise an information storing system configured to store management setting information for the restoring operation to which the management setting information changed by the management setting information changing system is to be restored in the restoring operation performed by the management setting information restoring system. In this case, in the restoring operation, the management setting information restoring system may make the management setting information changed by the management setting information changing system invalid, while the management setting information restoring system may read out the management setting information for the restoring operation from the information storing system, and set the read management setting information for the restoring operation currently valid. Thereby, when the changed management setting information becomes unnecessary, the aforementioned restoring operation can immediately performed using the separately stored management setting information for the restoring operation.

There is a case where the peripheral device used in common by the plurality of terminal devices via the network is connected to the network together with the plurality of terminal devices, and the management setting information is used for configuring the management settings on the usage of the peripheral device by the terminal device via the network. In this case, optionally, the peripheral device may comprise a first management setting information storing portion configured with a volatile memory (e.g., a RAM) to store currently valid management setting information used in a process of managing the network; and a second management setting information storing portion configured with a non-volatile memory (e.g., a RAM with a backup power supply or an electrically rewritable ROM such as an EEPROM and flash memory) to serve as the information storing system.

In this case, optionally, the management setting information restoring system may be configured to rewrite the currently valid management setting information stored in the first management setting information storing portion with the management setting information for the restoring operation read out from the second management setting information storing portion. Whether the setting changes for the management setting information are temporary or not (namely, temporary or definite), the changed management setting information as written has to be stacked in an allocated memory space of software using the management setting information. The first management setting information storing portion is used as the stack area. The aforementioned restoring operation can simply be performed by rewriting (for example, overwriting) the information stored in the first management setting information storing portion with the management setting information for the restoring operation read out from the non-volatile memory. It is noted that, in the aforementioned configuration, the information storing system is provided in the peripheral device, and there is performed an operation for rewriting the information stored in the first management setting information storing portion with the management setting information for the restoring operation in response to the restoring condition being satisfied. Accordingly, with a restoring condition judging system that judges whether the restoring condition is satisfied being provided in the peripheral device, the aforementioned restoring operation can be completed in the peripheral device, so that the restoring operation can be simplified.

When the peripheral device is booted, the management setting information for the restoring operation read out from the second management setting information storing portion can be loaded in the first management setting information storing portion as default management setting information. In this case, a process of changing the management setting information can be executed in the process of rewriting the management setting information in the first management setting information storing portion. After the peripheral device has been powered off, the changed management setting information stored in the first management setting information is lost. Thereafter, when the peripheral device is booted again, the management setting information for the restoring operation is automatically reloaded in the first management setting information storing portion.

In the present invention, for example, when an administrator of a higher level provides a change input for changing the management setting information with intent to permanently change it, it is not desirable that the changed management setting information is lost in the restoring operation. Therefore, optionally, the at least one of the plurality of terminal devices may further comprise an input interface through which an input for changing the management setting information is provided. In this case, the input interface may comprise a mode selecting system configured for selecting one of a restoring mode where the restoring operation is performed to restore the management setting information changed through the input interface and a definite mode where the changed management setting information is definitely made valid as far as a new input for changing the management setting information is not provided through the input interface. In this case, the management setting information restoring system may be configured to perform the restoring operation in response to the restoring mode being selected. Thereby, with the restoring mode not being selected for the changed management setting information that is not to be restored, there can be prevented such a trouble that the changed management setting information is lost in the unintended restoring operation.

In the aforementioned configuration in which one of the restoring mode and definite mode can be selected, the following aspect is possible. Namely, optionally, the at least one of the plurality of terminal devices may comprise a changed management setting information sending system configured to send, to the peripheral device, the management setting information changed by the management setting information changing system, the changed management setting information sending system being configured to send, to the peripheral device, restoring mode identification data as well as the changed management setting information in response to the restoring mode being selected. Optionally, the peripheral device may be configured to receive the changed management setting information and load the changed management setting information in the first management setting information storing portion. and the management setting information restoring system may be configured to rewrite the changed management setting information stored in the first management setting information storing portion with the management setting information for the restoring operation read out from the second management setting information storing portion, in response to the restoring condition being satisfied. Thereby, when the restoring mode is not selected, the restoring mode identification data are not attached to the changed management setting information sent by the terminal device. Hence, there can certainly be prevented such a trouble that the changed management setting information stored in the first management setting information storing portion is rewritten with the management setting information for the restoring operation at the side of the peripheral device that has received the changed management setting information.

Meanwhile, optionally, the peripheral device may further comprise an information updating system configured to update the management setting information for the restoring operation stored in the second management setting information storing portion with the received information. Thereby, when the restoring mode identification data have not received by the peripheral device, the current mode is judged as the aforementioned definite mode, and a process of updating the management setting information for the restoring operation can smoothly be executed.

When the peripheral device used in common by the plurality of terminal devices via the network is connected to the network together with the plurality of terminal devices, and the management setting information is used for configuring the management settings on the usage of the peripheral device by the terminal device via the network, the following configuration is possible. Namely, optionally, the peripheral device may comprise a management setting information storing portion configured with a volatile memory to store currently valid management setting information used in a process of managing the network. Still optionally, the at least one of the plurality of terminal devices may include the information storing system, the at least one of the plurality of terminal devices being configured to receive the management setting information before being changed from the peripheral device and store the received information in the information storing system, when the management setting information is changed by the management setting information changing system. In this case, the management setting information restoring system may be configured to read out the management setting information for the restoring operation from the information storing system, and to send the read management setting information for the restoring operation to the peripheral device, in response to the restoring condition being satisfied. Optionally, the peripheral device may be configured to receive the management setting information for the restoring operation, and to rewrite the currently valid management setting information stored in the management setting information storing portion with the received management setting information for the restoring operation. Thereby, even though the management setting information restoring system is not provided in the peripheral device, a main portion of the process can be completed in the terminal device. Therefore, variations of the peripheral device to which the present invention can be applied are increased. In this case, the at least one of the plurality of terminal devices may further comprise a restoring condition judging system configured to judge whether the restoring condition is satisfied.

Optionally, the at least one of the plurality of terminal devices may comprise a user registering system configured to register users of the at least one of the plurality of terminal devices associated with respective access levels to the network, each of which represents a level of a change authority for changing the management setting information. Optionally, the information storing system may be configured to store, as the management setting information for the restoring operation, the management setting information configured by a user who is given a higher access level than a predetermined access level among the registered users. Namely, the user of a higher access level is generally a higher level of network administrator who totally grasps use conditions of the network. Therefore, with the management setting information configured by the network administrator being preferentially utilized as the management setting information used in the restoring operation, the higher level of network administrator can easily grasp a management setting condition after the restoring operation.

In this case, the management setting information restoring system may be configured to perform the restoring operation for restoring the management setting information that has been changed by a user whose access level is lower than that of a user who has configured the management setting information for the restoring operation. According to the network management system configured as above, by application of the aforementioned restoring operation, the management setting information configured by the user of a higher access level is given priority over the management setting information changed by the user of a lower access level. Therefore, the network setting management can more reasonably be performed.

Furthermore, the network may be connected to an external communication network used for sending and receiving an e-mail. In this case, at least one of the plurality of terminal devices may be used as a mail server, and the management setting information may include setting information for the at least one of the plurality of terminal devices as the mail server. When the setting information of the mail server has been changed, for example, it might be impossible to send and receive an e-mail from a terminal device (or the aforementioned printing device provided with the mail sending and receiving function) that does not meet the changed setting information. Accordingly, the present invention can prevent such a trouble.

Illustrative Aspects

Figure 1:
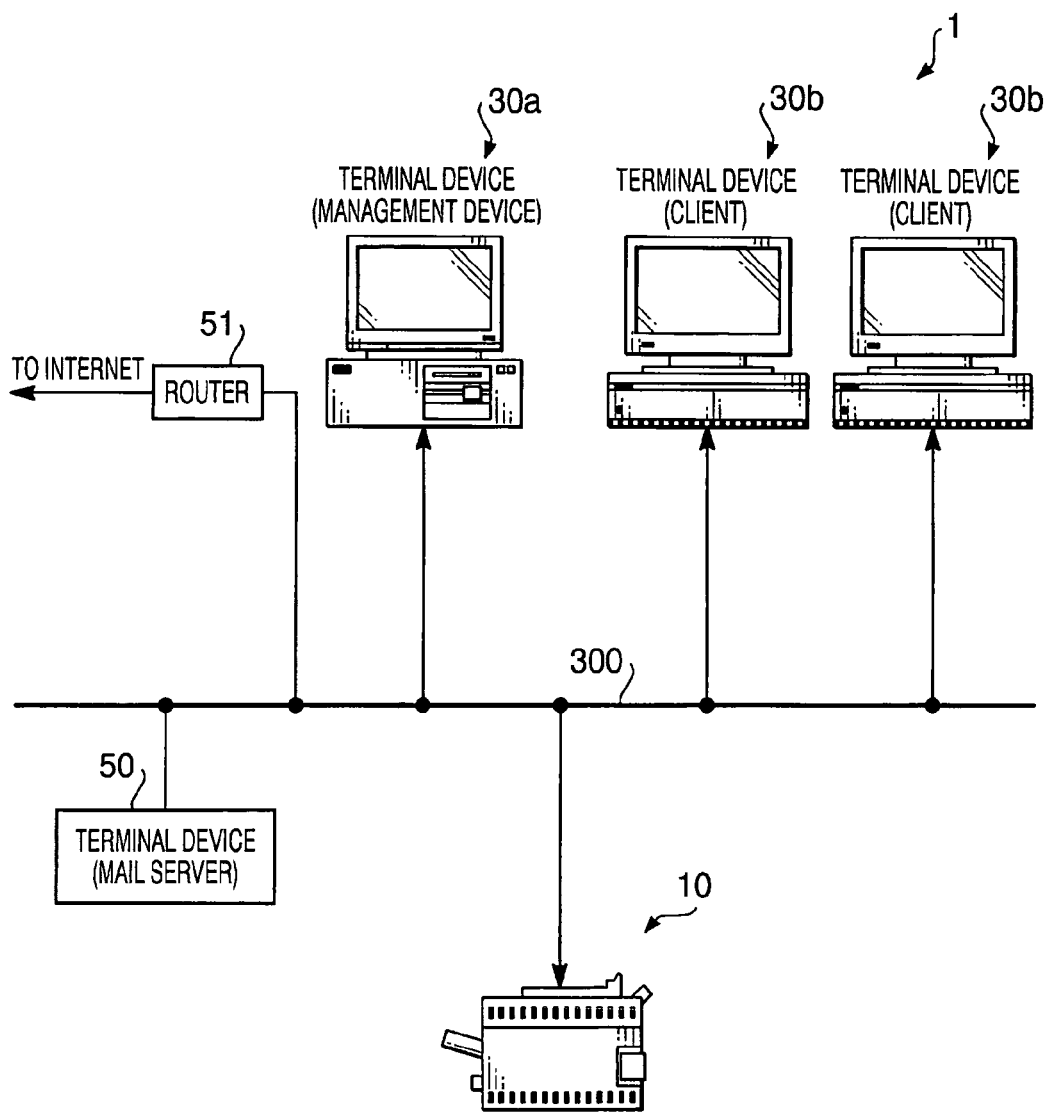
FIG. 1 is a schematic block diagram exemplifying a configuration of a network management system in accordance with one or more aspects of the present invention.

Hereinafter, illustrative aspects according to the present invention will be described with reference to the accompanying drawings. FIG. 1 schematically shows an example of a network management system 1 to which the present invention is to be applied. The network 1 is provided with a plurality of terminal devices 30a, 30b, and 50, a printing device 10 as a peripheral electronics device, and a network 300 through which the plurality of terminal devices 30a, 30b, and 50, and the printing device 10 are interconnected. The network 300 is connected to an internet communication network configured with a local IP network (e.g., an ADSL communication network or an optical communication network) via a broadband router 51. The internet communication network serves as an external communication network employed for sending and receiving an e-mail. The terminal device 50 is used as a mail communication server for sending and receiving the e-mail.

Figure 2:
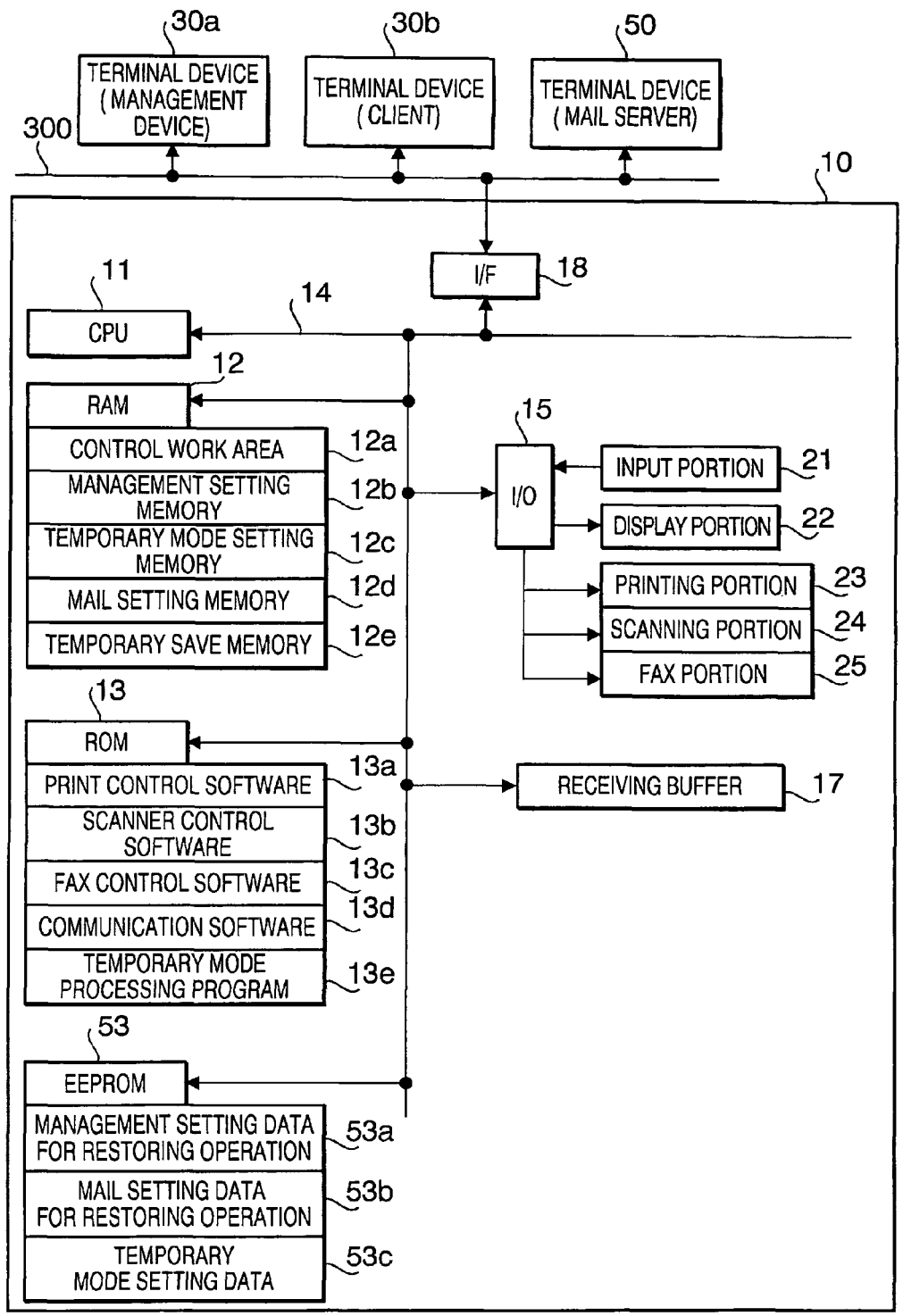
FIG. 2 is a block diagram exemplifying an electrical configuration of a printing device in accordance with one or more aspects of the present invention.

FIG. 2 is a block diagram showing an electrical configuration of the printing device 10. A main controller of the printing device 10 consists of computer hardware configured with a CPU 11, ROM 13, RAM 12 (volatile memory), EEPROM 53 (rewritable non-volatile memory), communication interface 18 configured to communicate with the network 300, receiving buffer memory 17, and input/output (I/O) portion 15 being connected via an internal bus 14. The I/O portion 15 is connected with a printing portion 23 configured with a widely known inkjet printing mechanism, laser printing mechanism, thermal transfer printing mechanism, dot impact printing mechanism, or the like, a display portion 22 configured with an LCD or the like, and an input portion 21 configured with a touch panel, press button switches, numeric keypads, or the like.

In addition, the printing device 10 in the illustrative aspects is configured as a so-called MFP (Multi Function Peripheral), and the input portion 21 is further connected with a scanning portion 24 employed for scanning and/or making a photocopy of an image, and a facsimile portion 25 as objects to be connected with the input portion 21. Operations of the printing portion 23, scanning portion 24, and facsimile portion 25 are widely known, and each of these portions 23, 24, and 25 is controlled with the CPU 11 executing a corresponding one of control software 13a, 13b, and 13c in a control work area 12a of the RAM 12.

Further, the printing device 10 is provided with a mail receiving source device function for receiving an e-mail that includes printing image data sent via the external communication network connected with the network 300, and a mail sending source device function for incorporating printing image data received from the terminal devices 30a and 30b via the network 300 into an e-mail to send the e-mail to the external communication network. Software that actualizes the aforementioned mail sending and receiving functions, which is widely known, is incorporated into the communication software 13d stored in the ROM 13.

Figure 3:
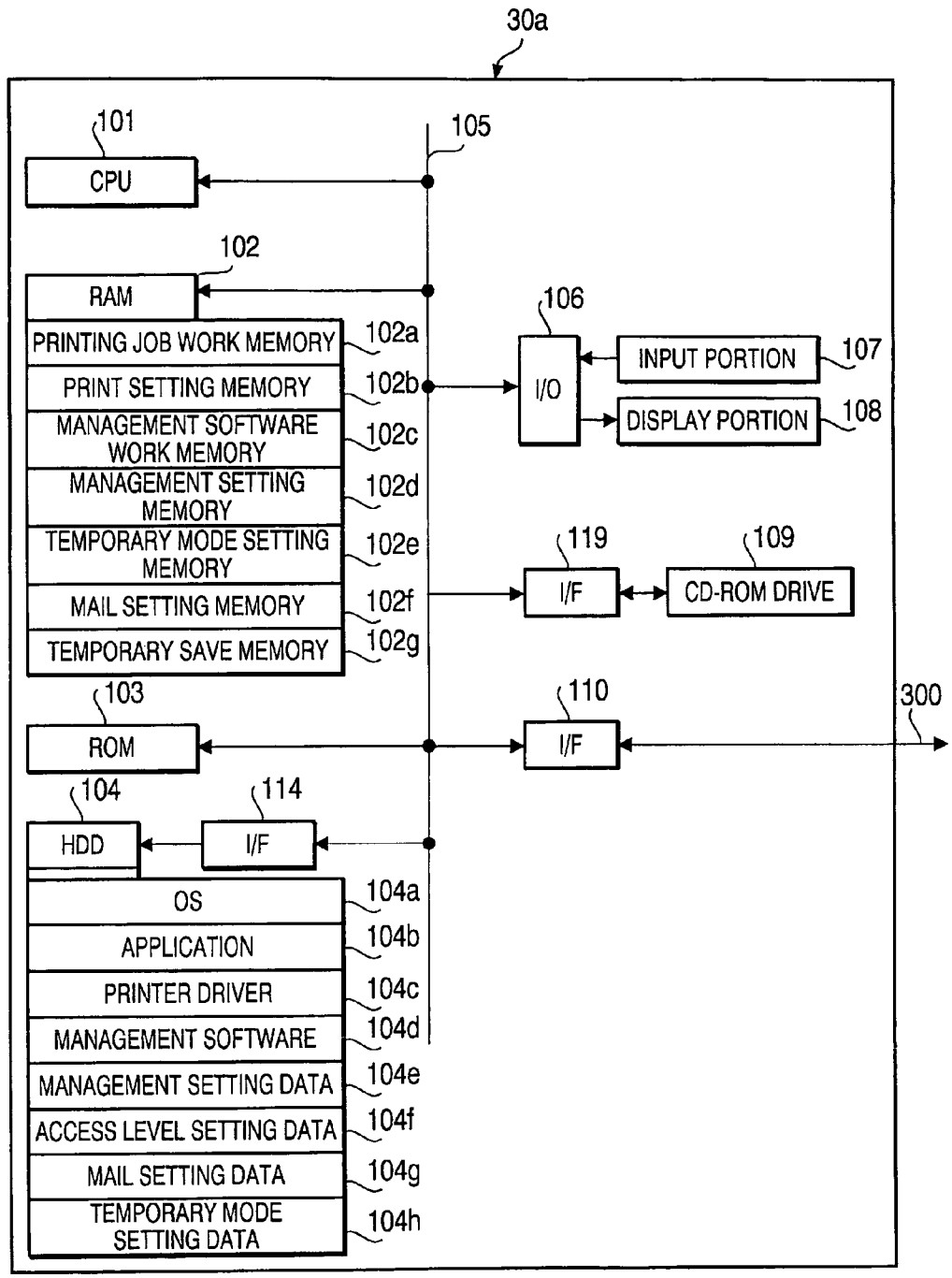
FIG. 3 is a block diagram exemplifying an electrical configuration of a terminal device at a side of a management device in accordance with one or more aspects of the present invention.
Figure 4:
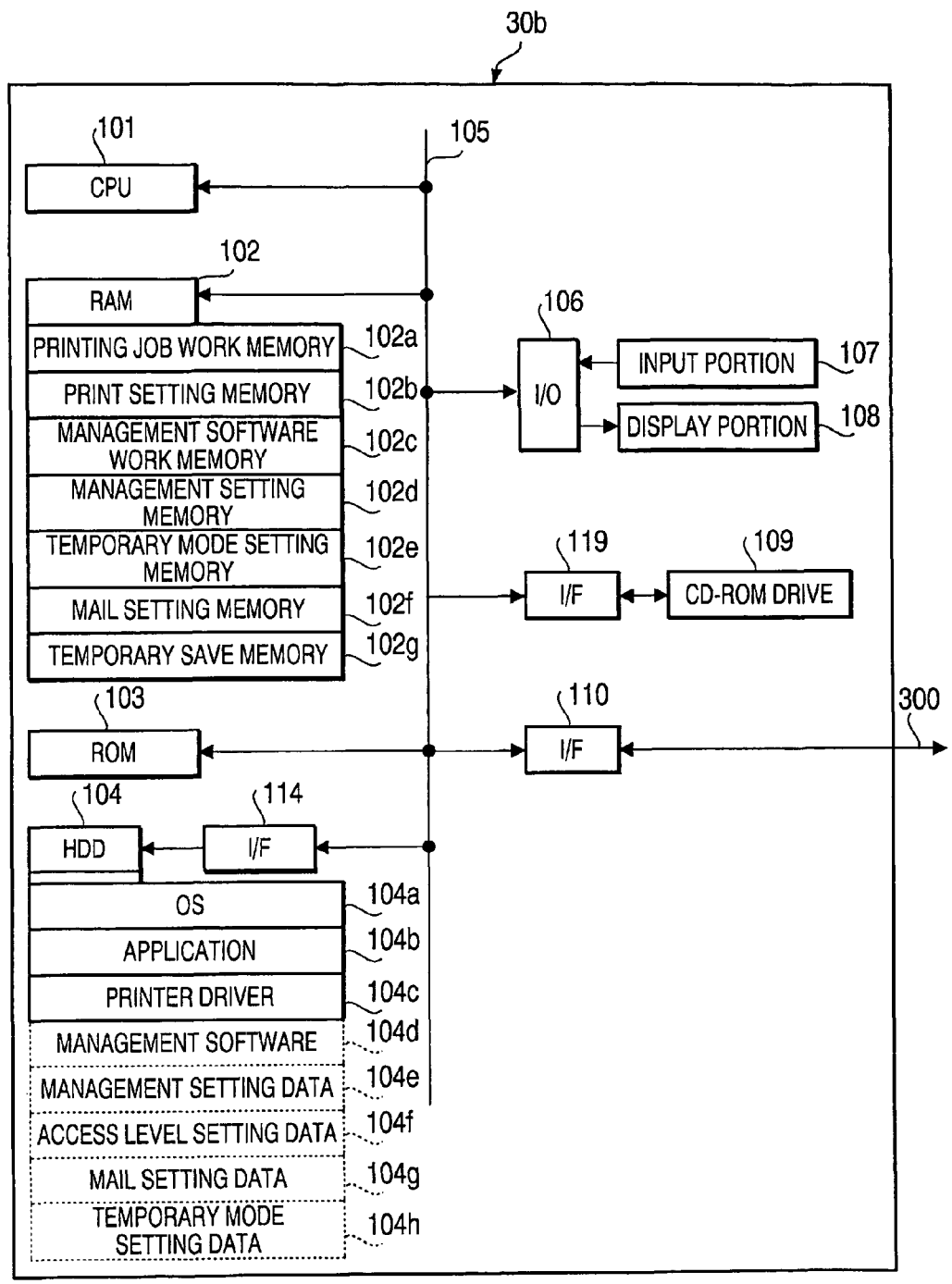
FIG. 4 is a block diagram exemplifying an electrical configuration of a terminal device at a side of a client in accordance with one or more aspects of the present invention.

The terminal devices 30a, 30b, and 50 are configured as widely known personal computers or work stations. Each of hardware portions of the terminal devices 30a, 30b, and 50 is, as shown in FIGS. 3 and 4, configured with a communication interface 110 and input/output (I/O) portion 106 for sending data to and receiving data from a CPU 101, RAM 102, ROM 103, and network 300 being connected via an internal bus 105. In addition, a storage device 104 (an HDD is applied as the storage device 104 in the illustrative aspects), CD-ROM drive 109, and the like are connected via interfaces (I/F) 114 and 119. Further, the I/O portion 106 is connected to a display portion 108 configured with an LCD or a CRT, and to an input portion 107 configured with a keyboard, a mouse, or the like.

There are installed in the storage device 104 an OS 104a as infrastructure software for each of the terminal devices 30a, 30b, and 50, various application software 104b having printing functions, a printer driver 104c configured to execute a print control instructing process for the printing device 10 (see FIG. 1) via the network 300. When being instructed to execute a printing job issued from the application software 104b, the CPU 101 executes the printer driver 104c using the printing job work memory 102a, and printing data concerning the printing job is transmitted to the printing device 10 via the network 300. Print setting data such as a printing format can, as required, be configured from a printing job window (not shown), and is employed with being loaded into a print setting memory 102b. When performing a printing operation, binary printing data, configured with the print setting data being attached to printing data to be rasterized, are forwarded to the printing device 10. The printing device 10 rasterizes the printing data to bit-mapped page printing image data with reference to the print setting data, and performs the printing operation.

In order to use the network 300 with each of the terminal devices 30a, 30b, and 50, that is, in order to access, from one of the terminal devices connected to the network 300 (e.g., the terminal device 30a or 50), another terminal device connected to the network 300 (e.g., the terminal device 30b) or the printing device (peripheral electronics device) 10 via the network 300, the aforementioned management settings for using the network 300 have to be configured. The management settings can be configured by executing management software 104d installed into the storage device 104 of the terminal device 30a as a management device.

Specifically, when running the management software 104d (to be executed using a management software work memory 102c) in the terminal device 30a, one of management setting windows 210, 211, and 212 as shown in FIGS. 6, 7, and 8, respectively is displayed as a management setting interface on the display portion 108 of the terminal device 30a with a graphic user interface on the OS 104, so that management setting information can be inputted on the management setting window 210, 211, or 212 using the input portion 107. In addition, the management setting window 210, 211, or 212 serves as a change input interface for inputting changes of the management setting information (management setting data) configured once, and the management setting information can be changed based on a change input operation on the management setting window 210, 211, or 212.

As shown in FIG. 3, the management settings are configured for the terminal device 30a (management device) with the management setting data being written into a memory area 104e of the storage device 104. In addition, the management setting data of another terminal device 30b (or 50) and the printing device (peripheral electronics device) 10 are inputted on the management setting window 210, 211, or 212 of the terminal device 30a, and are forwarded to the devices 30b, 50, and 10 as destinations via the network 300. As shown in FIG. 4, the management setting data received are written into a memory area 104e of the storage device 104 in the terminal device 30b. Further, as shown in FIG. 2, the management setting data received are written into a memory area 53a of the EEPROM 53 in the printing device (peripheral electronics device) 10.

In the illustrative aspects, the management setting data are defined network protocol setting information necessary for accessing the network 300. By running the management software, selecting a device (peripheral electronics device (i.e., printing device 10) or each of the terminal devices 30a, 30b, and 50) for which the management settings are to be configured, and opening the management setting window 210 as shown in FIG. 6, each of an IP address, subnet mask, and gateway (since any of them is widely known setting information, detailed explanation about them is omitted) can be inputted and set as configurable network protocol setting information.

In addition, as aforementioned, the printing device 10 shown in FIG. 2 is provided with the mail receiving source device function and mail sending source device function. Mail setting information, including receiving server settings and sending server settings for the printing device 10 sending and receiving an e-mail, is stored as mail setting data in a memory area 53b of the EEPROM 53, and is used with being loaded into a mail setting memory 12d of the RAM 12 as required.

The management setting data (information) stored in the management setting memories 102d and 12b of the terminal devices 30a and 30b and the printing device 10 can be rewritten from the management software 104d, yet cannot be rewritten from the application software 104b. On the other hand, the print setting data stored in the print setting memory 102d can be rewritten from the application software 104b (thereby, from the printer driver 104c that operates associated therewith).

In addition, the management software 104d can be installed in a terminal device other than the management device, for example, as shown in FIG. 4, in the terminal device 30b (further, in the terminal device 50) at a client side as well. Thereby, it is possible to write or overwrite the management setting information from a terminal device other than the management device. In the following explanation, it is supposed that the management software 104d is installed into the terminal device 30b and the terminal device 50.

The management setting information for each of the printing device 10, and the terminal devices 30a, 30b, and 50 can be changed, as required, by the management software 104 using one of the management setting windows 210, 211, and 212 shown in FIGS. 6, 7, and 8, respectively, as a change input interface. In this case, as far as any new changes are not inputted through the change input interface, the changed management setting information can be treated in any one of a definite mode where the changed management setting information are definitely made valid and an automatically restoring mode where an automatically restoring process for restoring the changed management setting information to predetermined management setting information before being changed when a predetermined automatically restoring condition (temporary mode terminating condition) is satisfied. It is noted that, in the illustrative aspects, the automatically restoring mode is also referred to as a "temporary mode" in a meaning that the changed management setting information is temporarily made valid.

For example, the management setting window 210 shown in FIG. 6 is used for inputting and changing network protocol settings. When selecting a device for which the user wishes to change the network protocol settings, and opening the management setting window 210, a current setting value (Current Status) of each of the IP address, subnet mask, and gateway is read out from the management setting memory 102d to be displayed in a corresponding one of display windows. Referring to the current setting value, the user inputs a changed value in a corresponding one (Set Value) of windows for inputting changed values using the input portion 107 (see FIG. 3 or FIG. 4). When the definite mode is to be selected, an "Apply" button is clicked. On the other hand, when the automatically restoring mode is to be selected, a "Temporary Apply" button is clicked.

In addition, the management setting window 211 shown in FIG. 7 is for inputting and changing the mail setting information including a mail sending server address (SMTP Server Address), a mail receiving server address (POP3 Server Address), and an e-mail address of the printing device 10 (Printer E-Mail Address). Further, the management setting window 211 shown in FIG. 7 is for inputting and changing the mail setting information including a mail sending server address (SMTP Server Address), an e-mail address (Administrator E-Mail Address) as a destination of an e-mail from the printing device 10 (peripheral electronics device), and an e-mail address of the printing device 10 (Printer E-Mail Address). Any of the windows has the same basic configuration as that of the management setting window 210 shown in FIG. 6.

As aforementioned, when the management setting information for the terminal device that has inputted the changes of the management setting information (30a in this case), is changed, management setting information stored in the management setting memory 102d (RAM 102) or the mail setting memory 102f of the terminal device is updated with the inputted management setting information (i.e., the old management setting information is made invalid, and the new management setting information is made valid instead). In the meantime, when the management setting information for a terminal device (the terminal device 30b or the printing device 10) other than the terminal device that has inputted the changes of the management setting information is changed, the inputted management setting information is sent to a device for which management setting information is to be changed via the network 300. When the device for which the management setting information is to be changed is the terminal device 30b, the management setting information stored in the management setting memory 102d (RAM 102) or the mail setting memory 102f (RAM 102) shown in FIG. 4 is updated with the sent management setting information. Further, when the device for which the management setting information is to be changed is the printing device 10, the management setting information stored in the management setting memory 12b (RAM 12) or the mail setting memory 12d (RAM 12) shown in FIG. 2 is updated with the sent management setting information.

In this case, when the definite mode is selected, for the terminal device 30a or 30b, the management setting data 104e or the mail setting data 104g stored in the storage device 104 shown in FIG. 3 or FIG. 4 are updated with the inputted or sent management setting information after the changes. Meanwhile, for the printing device 10, management setting data for a restoring operation 53a (stored in the EEPROM 53) are updated with the sent management setting information. Thus, the updated management setting information is definitely written into the non-volatile storage device 104 or the EEPROM 53, and is employed as management setting information to which the changed management setting information is to be restored when the automatically restoring mode is selected.

There are registered in the storage device 104 of the terminal device 30a or 30b access level setting data 104f. The access level setting data 104f are registered with each of users of the terminal device 30a or 30b being associated with an access level in accessing the network 300. User names and passwords are stored in the access level setting data 104f associated with the respective access levels (a smaller value of the access level represents a higher access level). In addition, information on what kind of authority to change the management setting information each of the users has is also stored associated with the access level. Specifically, a user of the highest access level (1) has a change authority (A) to change all kinds of management setting information, while a user of the middle access level (2) has a change authority (B) to change some kinds of management setting information (e.g., only setting data 2 of the management setting information configured with setting data 1 and setting data 2). Further, some of the users of the lowest access level (3) can have the change authorities (B), yet the other users of the lowest access level (3) can have no change authority (C) to change any kinds of management setting information.

When the definite mode is selected, and the updated management setting information is definitely written into the non-volatile storage device 104 or EEPROM 53, the access level (or the user name) of the user who has made the definite changes (changes in the definite mode) is stored along with the management setting information. Next, when another user requests to change the management setting information in the definite mode, it is judged whether the definite changes are to be allowed with reference to the access level setting data 104f. When the access level of the aforementioned another user is higher than that of the user who has made the precedent definite changes to the management setting information, the definite mode selected by the aforementioned another user is accepted. Meanwhile, when the access level of the aforementioned another user is lower than that of the user who has made the precedent definite changes, the definite mode selected by the aforementioned another user is rejected. It is noted that, when the access levels of both of the users are the same, it is judged, in accordance with an appropriate arrangement that has previously been made, whether the selected definite mode is accepted (e.g., only when the change authority to change the management setting information is given to the aforementioned another user, the selected definite mode is accepted).

In the meantime, when the temporary mode (automatically restoring mode) is selected, the management setting information is rewritten only in a management setting information storing portion configured for storing the management setting information on the RAM 102 or the RAM 12, yet the management setting information is not rewritten or updated in a storing portion configured for storing the management setting information for the restoring operation as a non-volatile storing portion (the storage device 104 or the EEPROM 53). Specifically, when the management setting information for a terminal device (30a in this case) on which a change input has been provided is changed in the temporary mode, the management setting information stored in the management setting memory 102d (RAM 102) or the mail setting memory 102f of the terminal device is updated with the inputted management setting information. On the other hand, when the management setting information for a device (the terminal device 30b or the printing device 10) other than the terminal device at that the change input has been provided is changed, the inputted management setting information, with automatically restoring mode identification data (temporary change identification data) being attached thereto, is sent to a device for which the management setting information is to be rewritten via the network. When the device is the terminal device 30b, the information stored in the management setting memory 102d (RAM 102) shown in FIG. 4 or in the mail setting memory 102f is overwritten and updated with the sent management setting information. Meanwhile, when the device is the printing device 10, the information stored in the management setting memory 12b (RAM 12) shown in FIG. 2 or in the mail setting memory 12d is overwritten and updated with the sent management setting information. The automatically restoring mode identification data (temporary change identification data), for example, can be provided as an identification bit added to the beginning or the ending of the data string of the management setting information (the changed information) to be sent. The identification bit makes it possible to identify whether the temporary mode is selected as an identification bit of "0" represents that the temporary mode is not selected, while an identification bit of "1" represents that the temporary mode is selected.

When the temporary mode is selected, the management setting information is changed in the management setting information storing portion on the RAM 102 or the RAM 12. Thereafter, when the predetermined automatically restoring condition (temporary mode terminating condition) is satisfied, the management setting information (before being changed) stored in the aforementioned storing portion for the management setting information for the restoring operation is read out, and a process in which the information stored in the management setting information storing portion is overwritten with the read management setting information is automatically performed. Namely, the automatically restoring process for restoring the changed management setting information to the predetermined management setting information before being changed is carried out.

Any one of the followings can be employed as an automatically restoring condition (temporary mode terminating condition). In the illustrative aspects, a desired automatically restoring condition can be selected by providing a selecting input on a selection window (not shown) on the management software 104d being run.

(Automatically Restoring Condition 1) After the selected temporary mode has been accepted, a software timer, configured to set a predetermined time period of waiting for changed management setting information to be automatically restored and to measure elapsed time until the set predetermined time period has elapsed, is booted. The automatically restoring process is carried out when the timer has completed the measurement of the set predetermined time period (a desired value can be inputted and set on the management software 104d.

(Automatically Restoring Condition 2) In a terminal device on which the change input for changing the management setting information is provided, when any input from users has not been given to an input portion of the terminal device for more than a predetermined time period after the change input had been provided, it is judged that a time period of waiting for the changed management setting information to be automatically restored has elapsed, and the automatically restoring process is performed. A time period for which any input has not been given to the input portion of the terminal device can be measured by a software timer in a similar fashion to the automatically restoring condition 1.

(Automatically Restoring Condition 3) When a client application including the management software or infrastructure software in a lower layer than the layer of the management software (i.e., a layer closer to a computer hardware side) has been completed, it is judged that an automatically restoring condition is satisfied, and the automatically restoring process is performed.

(Automatically Restoring Condition 4) When the printing device 10 (peripheral electronics device) is accessed by a terminal device after the change input for changing the management setting information has been provided on another terminal device, it is judged that an automatically restoring condition is satisfied, and the automatically restoring process is performed.

Information about which condition is selected among the automatically restoring conditions, including the setting values of the software timer in the automatically restoring conditions 1 and 2, is stored as temporary mode setting data (53*c* in FIG. 2, or 104*h* in FIG. 3 or FIG. 4), and is employed with being loaded in a temporary mode setting memory (12*c* in FIG. 2, or 102*e* in FIG. 3 or FIG. 4) as required.

As shown in FIGS. 3 and 4, when the management software 104*d* is incorporated in a terminal device (30*a* or 30*b*), a judging process for judging whether an automatically restoring condition as aforementioned is satisfied and a routine for executing the automatically restoring process (including the software timer in the automatically restoring conditions 1 and 2) may be incorporated in the management software 104*d*.

Further, in the case of the printing device 10 (peripheral electronics device), with a temporary mode processing program (including the software timer employed in the automatically restoring conditions 1 and 2), which takes on the judging process for judging whether an automatically restoring condition as aforementioned is satisfied and the automatically restoring process, being stored in the ROM 13 (e.g., a flash memory and the like, a separately provided non-volatile memory may be applied), the judging process and the automatically restoring process can be carried out at the initiative of the printing device 10 (a first aspect). In this case, the management setting data for the restoring operation 53*a* (and mail setting data for the restoring operation 53*b*), and temporary mode setting data 53*c* have to be stored at the side of the printing device 10.

On the other hand, it is possible to have the management setting information for the restoring operation at a side of a terminal device (e.g., the terminal device 30*a*) that is to provide the change input, and to judge whether the automatically restoring condition is satisfied at the side of the terminal device (a second aspect). When the automatically restoring condition is satisfied, the management setting information for the restoring operation is sent to the printing device 10 (peripheral electronics device) from the terminal device. The printing device 10 receives the management setting information for the restoring operation, and the automatically restoring process is executed by rewriting the information stored in the management setting memory 12*b* with the management setting information for the restoring operation. In the second aspect, a temporary mode processing program 13*e*, the management setting data for the restoring operation 53*a* (and mail setting data for the restoring operation 53*b*), and temporary mode setting data 53 at the side of the printing device 10 can be omitted.

FIG. 9 is a flowchart showing an example of a procedure of the management software at a terminal device side. In a step of S1, a user who is to change the management setting information inputs a user name and a password. In a step of S2, the inputted user name and password are verified with reference to the access level setting data 104*f*. In a step of S3, it is judged whether the change authority is given to the user (namely, whether the user name of the user is registered in the access level setting data 104*f*). When it is not judged that the change authority is given to the user (S3: No), the process is terminated. Meanwhile, when it is judged that the change authority is given to the user (S3: Yes), a corresponding one of the management setting windows shown in FIGS. 6 to 8 is opened by providing an input representing which management setting information is to be changed (S4). In a step of S5, the current management setting information (the management setting data for the restoring operation 53*a*) is obtained from the printing device 10 via the network 300, and is displayed on the management setting window.

In a step of S6, changed management setting information is inputted on the management setting window, and it is judged which has been selected among the definite mode (Apply), temporary mode (automatically restoring mode: Temporal Apply), and cancel (Cancel) (S7, S10, and S12). When the definite mode is selected in the step of S7, the process goes to a step of S8 to judge whether the user is a user who is authorized to select the definite mode with reference to the access level setting data 104*f* (information about whether the change authority is permitted that corresponds to a level of each of the users). When the user is authorized to select the definite mode, the process goes to a step of S9. Then, the changed management setting information that has been inputted, without the temporary change identification data being attached thereto (for instance, with the aforementioned identification bit being "0", is sent to the printing device 10. At this time, even though the user is of a low level, especially when a user of a higher level who has configured the management setting data for the restoring operation gives the change authority to the user of a low level (for example, when the user of the low level is defined as a user of the change authority "B" and the access level "3"), the changed management setting information is sent to the printing device 10, with identification data for identifying whether the change authority is permitted by the user of a higher level being attached thereto along with the aforementioned temporary change identification data. (For example, a dedicated identification bit different from the aforementioned identification bit is separately provided, and is set to be "1". The identification bit is set to be "0" in the case without the identification data being attached.)

Meanwhile, when the temporary mode is selected in the step of S10, or when it is not judged that the user is a user who is authorized to select the definite mode (for example, when a user name of the user is "Hansuke Heida", "Akio Ueno", or "Fuita Kazega" in FIG. 5), the process goes to a step of S11, so as to make the transition to the temporary mode, and send the changed management setting information inputted, with the temporary change identification data being attached thereto, to the printing device 10. It is noted that, in a flow of S8 to S11, since the transition to the temporary mode is made despite the user's intention, that effect is desired to be displayed with an alert or the like. Further, when the "Cancel" is selected in the step of S12, the process goes to a step of S13 to reset the changed management setting information inputted, and terminate the process.

FIG. 10 is a flowchart showing an example of a procedure of the temporary mode processing program executed by the printing device 10. In a step of S51, a change request for changing the management setting information is received from a terminal device. In a step of S52, it is judged whether the change request is issued by a user who is given the change authority. When it is not judged that the change request is issued by a user who is given the change authority (S52: No), the process is terminated. It is noted that, although a similar judgment step to the above is executed in the process performed by the terminal device as shown in FIG. 9, one of the judgment steps may be omitted.

In a step of S53, it is judged whether the temporary change identification data are attached to the changed management setting information received. When it is not judged that the temporary change identification data are attached to the changed management setting information received (S53: No), the process goes to a step of S54, so as to check the access level of a user who has configured the management setting data for the restoring operation stored in the EEPROM 53, and to judge whether the access level of a user who has sent the change request for changing the management setting information this time is higher than (or equal to) the above checked access level. When it is judged that the access level of the user who has sent the change request is higher than (or equal to) the checked access level (S54: Yes), the process goes to a step of S55 to overwrite and update the management setting information stored in the EEPROM 53 as the management setting data for the restoring operation 53a with the received management setting information. In addition, even though the judgment result is "No" in the step of S54, especially when the user of a higher level who has configured the management setting data for the restoring operation has set a mode where the user of a lower level is authorized to change the management setting information in a step of S56 (S56: Yes), the process goes to the step of S55 to change the management setting information in the definite mode in the same way.

In the meantime, when the temporary change identification data are attached to the changed management setting information in the step of S53 (S53: Yes), or when the user of a higher level who has configured the management setting data for the restoring operation has not authorized the user of a lower level to change the management setting information in the step of S56 (S56: No), the process goes to a step of S57 to judge whether the user of a lower level is authorized to change the management setting information in the temporary mode (for example, when the user of a higher level has set a mode where a user of a lower level is not authorized to change the management setting information in the temporary mode even though the user of a lower level has sent the change request). When it is not judged that the user of a lower level is authorized to change the management setting information in the temporary mode (S57: No), the process is terminated. Meanwhile, when it is judged that the user of a lower level is authorized to change the management setting information in the temporary mode (S57: Yes), the process goes to a step of S58 to overwrite only the currently used management setting information in the management setting memory 12b with the changed management setting information without changing the management setting data for the restoring operation 53a in the EEPROM 53 as a changing operation in the temporary mode.

In a step of S59, it is judged whether an automatically restoring condition of the temporary mode (automatically restoring mode) is satisfied. It is possible to grasp which condition is set among the aforementioned four automatically restoring conditions by referring to the information in the temporary mode setting memory 12c. FIG. 11 is a flowchart showing an example of a procedure of a satisfaction judging routine for judging whether the automatically restoring condition 1 is satisfied. FIG. 12 is a flowchart showing an example of a procedure of a satisfaction judging routine for judging whether the automatically restoring condition 2 is satisfied. FIG. 13 is a flowchart showing an example of a procedure of a satisfaction judging routine for judging whether the automatically restoring condition 3 is satisfied. FIG. 14 is a flowchart showing an example of a procedure of a satisfaction judging routine for judging whether the automatically restoring condition 4 is satisfied. When an automatically restoring condition is satisfied, the process goes to a step of S60, so as to read out the management setting information for the restoring operation stored in the management setting data for the restoring operation 53a, and to restore the changed management setting information to the read management setting information for the restoring operation.

FIG. 15 is a flowchart showing an example of a procedure of a setting process for setting a temporary mode terminating condition (automatically restoring condition). Steps of S101 and S102 are for setting the automatically restoring condition 1. Steps of S103 and S104 are for setting the automatically restoring condition 2. Steps of S105 and S106 are for setting the automatically restoring condition 3. Steps of S107 and S108 are for setting the automatically restoring condition 4. When setting the automatically restoring conditions 1 and 2, duration of the temporary mode before the restoring operation is inputted to the software timer in the steps of S102 and S104, respectively. It is noted that, although, in the illustrative aspects, any one of the automatically restoring conditions is set in the setting process for setting the temporary mode terminating condition, the setting process may be configured to set two or more conditions.

In addition, when a precedent user has changed the management setting information in the temporary mode, and another user tries to further change the management setting information in the temporary mode before the temporary mode is terminated, a temporary mode conflict conciliation process as shown in FIG. 16 or FIG. 17 can be executed. FIG. 16 is a flowchart showing an example of a procedure of a temporary mode conflict conciliation process performed at a setting accepting side. In a step of S151, it is checked whether any new changed management setting information has been received. In the case of "Yes" (S151: Yes), the process goes to a step of S152 to check whether any precedent changed management setting information exists (in the case of "No" in the step of S151, the process is returned). Meanwhile, in the case of "Yes" in the step of S152, the process goes to a step of S153 to evacuate the precedent changed management setting information to a temporary save memory (12e in FIG. 2, or 102g in FIG. 3 or FIG. 4) (in the case of "No" in the step of S152, the step of S153 is skipped). Then, in a step of S154, the new changed management setting information is loaded into the management setting memory (the management setting information storing portion: 12b (12d) in FIG. 2, or 102d (102f) in FIG. 3 or FIG. 4).

FIG. 17 is a flowchart showing an example of a procedure of a temporary mode conflict conciliation process performed at a setting terminating side. In a step of S201, it is checked whether the management setting information loaded in the management setting memory satisfies the temporary mode terminating condition. When it is confirmed that the management setting information loaded in the management setting memory satisfies the temporary mode terminating condition (S201: Yes), the process goes to a step of S202 to make the management setting information invalid, and thereafter, goes to a step of S203. Then, when precedent management setting information is under being evacuated in the temporary save memory (S203: Yes), the precedent management setting information is read out and loaded into the management setting memory in a step of S204.

FIG. 18 is a flowchart showing an example of a procedure of a process of the management software executed by a terminal device, when the aforementioned second aspect is employed. This process corresponds to a process obtained by replacing the step of S11 of the process shown in FIG. 9 with a temporary mode management process in a step of S600. Namely, in the process, when the transition to the temporary mode is decided in the step of S8 or S10, the process goes to the step of S600. At the side of the printing device 10, every time new management setting information is sent from a terminal device, the information stored in the management setting memory 102d are overwritten and updated with the sent new information. FIG. 19 is a flowchart showing an example of a detailed procedure of the temporary mode management process. In a step of S601, the changed management setting information that has inputted is sent to the printing device 10. Hereinafter, an operation of terminating the temporary mode is controlled at the terminal device side. In a step of S602, it is judged whether the temporary mode terminating condition (automatically restoring condition) is satisfied. When it is judged that the temporary mode terminating condition is satisfied (S602: Yes), the process goes to a step of S603 to read out the management setting data 104e stored in the storage device 104, and to send the read management setting data to the printing device 10. The printing device 10 receives the sent management setting data, and restores the current changed management setting information to the management setting information before having been changed by overwriting the changed information stored in the management setting memory 102d with the received data.

What is claimed is:

1. A network management system, comprising:
a plurality of terminal devices;
a network to which the plurality terminal devices are connected; and
at least one peripheral device connected to the network, the at least one peripheral device being used in common by the plurality of terminal devices via the network based on communication setting information;
wherein at least one of the plurality of terminal devices comprises:
a display unit;
a communication setting information acquiring system that acquires new communication setting information to be set for the at least one peripheral device;
a display controller that controls the display unit to display a mode selecting screen for prompting a user to select one of:
a restoring mode where the new communication setting information set for the at least one peripheral device is restored to previous communication setting information in response to a predetermined restoring condition being satisfied; and
a definite mode where the new communication setting information set for the at least one peripheral device is definitely rendered valid; and
a communication setting information sending system that sends, to the at least one peripheral device via the network, the new communication setting information acquired by the communication setting information acquiring system, wherein:

the at least one peripheral device comprises:
a communication setting information receiving system that receives the new communication setting information from the at least one of the plurality of terminal devices via the network;
a setting changing system that:
when the restoring mode is selected via the mode selecting screen displayed on the display unit, changes the previous communication setting information currently set for the at least one peripheral device to the received new communication setting information without deleting the previous communication setting information; and
when the definite mode is selected via the mode selecting screen displayed on the display unit, changes the previous communication setting information currently set for the at least one peripheral device to the received new communication setting information and deletes the previous communication setting information; and
an automatic setting restoring system that:
when the restoring mode is selected via the mode selecting screen displayed on the display unit, automatically restores the new communication setting information set for the at least one peripheral device to the previous communication setting information in response to the predetermined restoring condition being satisfied; and
when the definite mode is selected via the mode selecting screen displayed on the display unit, does not restore the new communication setting information set for the at least one peripheral device to previous communication setting information even if the predetermined restoring condition is satisfied.

2. The network management system according to claim 1, wherein the automatic setting restoring system judges that the predetermined restoring condition is satisfied in response to a predetermined time period elapsing after the previous communication setting information has been changed by the setting changing system.

3. The network management system according to claim 1, wherein the automatic setting restoring system judges that the predetermined restoring condition is satisfied in response to a predetermined time period elapsing after the communication setting information acquiring system has acquired the new communication setting information, without the communication setting information acquiring system acquiring another new piece of communication setting information.

4. The network management system according to claim 1, wherein:
the setting changing system and automatic setting restoring system function with management software being run in the at least one of the plurality of terminal devices, and
the automatic setting restoring system judges that the predetermined restoring condition is satisfied in response to one of the management software and infrastructure software of a lower layer than the layer of the management software being terminated.

5. The network management system according to claim 1, wherein:
the at least one peripheral device comprises a mail sending and receiving function for sending and receiving an e-mail transmitted through an external communication network connected the network, and
the communication setting information includes information about the mail sending and receiving function.

6. The network management system according to claim 1, wherein each communication setting information includes information about settings for a network protocol of the at least one peripheral device.

7. The network management system according to claim 1, wherein:
the at least one peripheral device further comprises an information storing system that stores the previous communication setting information, and
in response to the predetermined restoring condition being satisfied when the restoring mode is selected, the automatic setting restoring system makes the new communication setting information invalid, while the automatic setting restoring system reads out the previous communication setting information from the information storing system, and sets the previous communication setting information valid.

8. The network management system according to claim 7, wherein:
the at least one peripheral device comprises:
a first communication setting information storing portion configured with a volatile memory to store the new communication setting information received by the communication setting information receiving system; and
a second communication setting information storing portion configured with a non-volatile memory to serve as the information storing system, and
the automatic setting restoring system, in response to the predetermined restoring condition being satisfied when the restoring mode is selected, rewrites the new communication setting information stored in the first communication setting information storing portion with the previous communication setting information read out from the second communication setting information storing portion.

9. The network management system according to claim 8, wherein the at least one peripheral device further comprises an information updating system that, when the definite mode is selected, updates the previous communication setting information stored in the second communication management setting information storing portion with the new communication setting information received by the communication setting information receiving system.

10. The network management system according to claim 7, wherein:
the at least one peripheral device comprises a communication setting information storing portion configured with a volatile memory to store the new communication setting information receive by the communication setting information receiving system,
the at least one of the plurality of terminal devices comprises a terminal-side information storing system, the at least one of the plurality of terminal devices that receives the previous communication setting information from the at least one peripheral device and stores the received previous communication setting information in the terminal-side information storing system, when the restoring mode is selected and the previous communication setting information is changed by the setting changing system,
the at least one of the plurality of terminal devices comprises a terminal-side setting information restoring system that reads out the previous communication setting information from the terminal-side information storing system, and sends the read previous communication setting information to the at least one peripheral device, in response to the restoring condition being satisfied, and
the communication setting information receiving system receives the previous communication setting information from the at least one of the plurality of terminal devices, and
the automatic setting information restoring system rewrites the new communication setting information stored in the communication setting information storing portion with the received previous communication setting information.

11. The network management system according to claim 7, wherein:
the at least one of the plurality of terminal devices comprises a user registering system that registers users of the at least one of the plurality of terminal devices associated with respective access levels to the network, each of which represents a level of a change authority for changing communication setting information, and
the information storing system stores the previous communication setting information configured by a user who is given a higher access level than a predetermined access level among the registered users.

12. The network management system according to claim 11,
wherein the automatic setting restoring system restores the new communication setting information configured by a user whose access level is lower than the access level of the user who has configured the previous communication setting information, to the precious communication setting information stored in the information storing system.

13. The network management system according to claim 1, wherein:
the network is connected to an external communication network used for sending and receiving an e-mail,
at least one of the plurality of terminal devices is used as a mail server, and
the communication setting information includes setting information for the at least one of the plurality of terminal devices as the mail server.

14. A network management system, comprising:
a plurality of terminal devices;
a network to which the plurality terminal devices are connected;
at least one peripheral device connected to the network, the at least one peripheral device being used in common by the plurality of terminal devices via the network based on communication setting information;
a display unit;
a communication setting information acquiring system that acquires new communication setting information to be set for the at least one peripheral device;
a display controller that controls the display unit to display a mode selecting screen for prompting a user to select one of:
a restoring mode where the new communication setting information set for the at least one peripheral device is restored to previous communication setting information in response to a predetermined restoring condition being satisfied; and
a definite mode where the new communication setting information set for the at least one peripheral device is definitely rendered valid;
a communication setting information sending system that sends, to the at least one peripheral device via the network, the new communication setting information acquired by the communication setting information acquiring system;

a communication setting information receiving system that receives the new communication setting information from the communication setting information sending system via the network;

a setting changing system that:
when the restoring mode is selected via the mode selecting screen displayed on the display unit, changes the previous communication setting information currently set for the at least one peripheral device to the received new communication setting information without deleting the previous communication setting information; and when the definite mode is selected via the mode selecting screen displayed on the display unit, changes the previous communication setting information currently set for the at least one peripheral device to the received new communication setting information and deletes the previous communication setting information; and an automatic setting restoring system that:
when the restoring mode is selected via the mode selecting screen displayed on the display unit, automatically restores the new communication setting information set for the at least one peripheral device to the previous communication setting information in response to the predetermined restoring condition being satisfied; and when the definite mode is selected via the mode selecting screen displayed on the display unit, does not restore the new communication setting information set for the at least one peripheral device to previous communication setting information even if the predetermined restoring condition is satisfied.

15. The network management system according to claim 14, wherein:
the at least one peripheral device is a printing device,
the communication setting information changing system and the communication setting information restoring system function with management software being run in at least one of the plurality of terminal devices, and
the management software is installed in the at least one of the plurality of terminal devices as different software from application software for generating a printing job for the printing device.

16. The network management system according to claim 1, wherein:
the communication setting information sending system sends the acquired new communication setting information and identification information for indicating which mode of the restoring mode and the definite mode is selected, to the at least one peripheral device via the network,
the communication setting information receiving system receives the new communication setting information and the identification information from the at least one of the plurality of terminal devices via the network, and
the at least one peripheral device further comprises a mode determining system that determines which mode of the restoring mode and the definite mode is selected, based on the identification information received by the communication setting information receiving system.

17. The network management system according to claim 1, wherein:
the at least one peripheral device further comprises a restoring condition determining system that, when the restoring mode is selected, determines whether the predetermined restoring condition is satisfied, and
the automatic setting restoring system, when the restoring mode is selected, automatically restores the new communication setting information set for the at least one peripheral device to the previous communication setting information in response to the restoring condition determining system determining that the predetermined restoring condition being satisfied.

18. The network management system according to claim 17, wherein:
the plurality of terminal devices comprise a different terminal device from the at least one of the plurality of terminal devices, and
the restoring condition determining system, when the restoring mode is selected, determines that the predetermined restoring condition is satisfied, in response to the at least one peripheral device being accessed by the different terminal device.

19. A terminal device connectable to a network,
the terminal device comprising:
a display unit;
a communication setting information acquiring system that acquires new communication setting information to be set for at least one peripheral device connected to the network, the at least one peripheral device being used by the terminal device via the network based on communication setting information;
a display controller that controls the display unit to display a mode selecting screen for prompting a user to select one of:
a restoring mode where the new communication setting information set for the at least one peripheral device is restored to previous communication setting information in response to a predetermined restoring condition being satisfied; and
a definite mode where the new communication setting information set for the at least one peripheral device is definitely rendered valid; and
a communication setting information sending system that sends, to the at least one peripheral device via the network, the new communication setting information acquired by the communication setting information acquiring system,
wherein the terminal device is communicable with a peripheral device via the network based on communication setting information, the peripheral device comprising:
a communication setting information receiving system that receives the new communication setting information from the at least one of the plurality of terminal devices via the network;
a setting changing system
that, when the restoring mode is selected via the mode selecting screen displayed on the display unit, changes the previous communication setting information currently set for the at least one peripheral device to the received new communication setting information without deleting the previous communication setting information, and
that, when the definite mode is selected via the mode selecting screen displayed on the display unit, changes the previous communication setting information currently set for the at least one peripheral device to the received new communication setting information and deletes the previous communication setting information; and an automatic setting restoring system
that, when the restoring mode is selected via the mode selecting screen displayed on the display unit, automatically restores the new communication setting information set for the at least one peripheral device to the previous communication setting information in response to the predetermined restoring condition being satisfied, and that, when the definite mode is selected via the mode selecting screen displayed on the display unit, does not restore the new communication setting information set for the at least one peripheral device to previous communication setting information even if the predetermined restoring condition is satisfied.

20. A device connectable to a network, the device being used by a plurality of terminal devices in common via the network based on communication setting information, the device comprising:

a communication setting information receiving system that receives new communication setting information from at least one of the plurality of terminal devices via the network;

a setting changing system that:
when notified that a restoring mode is selected via a mode selecting screen displayed on a display unit of the at least one of the plurality of terminal devices, changes previous communication setting information currently set for the device to the received new communication setting information without deleting the previous communication setting information, the restoring mode being a mode where the new communication setting information set for the device is restored to the previous communication setting information in response to a predetermined restoring condition being satisfied; and when notified that a definite mode is selected via the mode selecting screen displayed on the display unit, changes the previous communication setting information currently set for the device to the received new communication setting information and deletes the previous communication setting information, the definite mode being a mode where the new communication setting information set for the device is definitely rendered valid; and an automatic setting restoring system that:
when notified that the restoring mode is selected, automatically restores the new communication setting information set for the device to the previous communication setting information in response to the predetermined restoring condition being satisfied; and when notified that the definite mode is selected, does not restore the new communication setting information set for the device to previous communication setting information even if the predetermined restoring condition is satisfied.

* * * * *